United States Patent [19]

Parrack et al.

[11] 4,218,766
[45] Aug. 19, 1980

[54] METHOD OF SEISMIC WAVE AMPLITUDE NORMALIZATION

[75] Inventors: Alvin L. Parrack, Bellaire; Delbert R. Lunsford, Houston; Ronald A. Mikita, Bellaire, all of Tex.

[73] Assignee: Texaco Inc., White Plains, N.Y.

[21] Appl. No.: 948,732

[22] Filed: Oct. 5, 1978

Related U.S. Application Data

[63] Continuation of Ser. No. 540,039, Jan. 10, 1975, abandoned.

[51] Int. Cl.$^2$ .......................... G01V 1/28; G01V 1/36
[52] U.S. Cl. ....................................... 367/47; 367/54; 364/421
[58] Field of Search .............. 340/15.5 MC, 15.5 TE, 340/15.5 DS, 15.5 DP, 15.5 AC

[56] References Cited

U.S. PATENT DOCUMENTS

| 3,622,965 | 11/1971 | Wu | 340/15.5 AC |
| 3,671,930 | 6/1972 | Matzker | 340/15.5 AC |

OTHER PUBLICATIONS

O'Doherty et al., "Reflections on Amplitudes" 5/70, pp. 430–458, European Assoc. of Exploration Physicists, Edinburgh.

Primary Examiner—Nelson Moskowitz
Attorney, Agent, or Firm—Carl G. Ries; Thomas H. Whaley; Gregory A. Cone

[57] ABSTRACT

Disclosed is a method of processing geological seismic reflection data to compensate for lateral variations in the attenuation effect which the weathered layer has on the reflected seismic energy waves as they approach an array of detectors at the surface. Absolute amplitudes of the waves are summed for each trace throughout a test window at the depth to be explored. The amplitudes are normalized by taking the ratio of each sum to the sum of the absolute amplitudes obtained throughout a standard window, in the corresponding trace. In a particular embodiment disclosed, the test window scans each trace in increments, and the absolute amplitude sum obtained at each position is normalized to the standard window in that trace. The ratios thus obtained, when plotted, reveal the positions of large-amplitude reflecting strata without weathered-layer distortion.

4 Claims, 2 Drawing Figures 4,218,766

METHOD OF SEISMIC WAVE AMPLITUDE NORMALIZATION

This application is a continuation of application Ser. No. 540,039 filed Jan. 10, 1975 and now abandoned.

BACKGROUND OF THE INVENTION

1. Field of the Invention

The present invention pertains generally to the processing of seismic data. More specifically, the invention pertains to processing amplitude ratios in seismic data to enhance geological features in the mapping of such data by compensating for weathered layer effects.

2. Description of the Prior Art

In the search for hydrocarbon deposits, seismic reflection measurements have proven to be a useful tool. In a typical data gathering arrangement, an array of seismic wave detectors (geophones) is located near a seismic source or a string of seismic wave sources. The source or sources are triggered, causing seismic waves to propogate downwardly through the subsurface media. Variations in the physical properties of subsurface material are effective as acoustic impedance discontinuities which cause reflections of the seismic waves as well as alterations in the velocity of the waves. The reflected waves travel upwardly to the detectors where they are sensed and recorded, each detector, or group of detectors, producing a trace of seismic disturbance as a function of time. Usually, the signals from four to thirty-six detectors will be consolidated to produce a single recorded trace. With the detectors arranged generally along a line on the surface, each trace represents waves reflected upwardly at a position along the line.

It is well understood that the greater and more abrupt the impedance change across an interface between two materials is, the greater will be the reflected wave amplitude. The acoustic impedance of a medium is the product of the density of the medium times the velocity of propagation of the acoustic wave in that medium, and the velocity itself is dependent on the elastic properties of the medium. Consequently, information about the composition of the underground reflecting strata can be obtained by an analysis of the reflected wave amplitudes. Oil and gas deposits having relatively low densities are known to be good acoustic wave reflectors.

The analysis of the reflected waves is complicated by the fact that the reflected seismic waves must pass through near-surface strata that attenuate the wave velocity and may greatly absorb the wave energy, thereby decreasing the amplitude. These strata, found in what is referred to as the weathered layer, include water-bearing deposits and dry sand, both of which are relatively effective wave energy absorbers. The composition of the weathered layer, and, therefore, its wave energy absorption properties, vary laterally as well as vertically. Since, in a typical seismic data gathering operation, the lateral spacing between groups of detectors may represent 200 to 300 feet, and the total length of the detector arrays may be one mile, the weathered layer may vary greatly over the detector line. As a result, the weathered layer wave attenuation for each entire trace may be quite different from that of all the other traces. Therefore, the successful application of the reflection amplitude measurements to exploration and production of hydrocarbon deposits depends upon the development of an appropriate interpretive method.

SUMMARY OF THE INVENTION

The present invention provides a method of processing seismic records involving the continuous monitoring of reflection wave amplitudes. With the data from all the seismic detectors in the form of seismic disturbances as functions of time, two time windows are selected, one serving as a standard window, the other as a test window. As employed herein, the term "window" is intended to define a time span over which a trace is to be examined or processed. Since the time-dependence of the detected signals is related to the distances the signals must travel from the reflecting interfaces to the detectors, a plot, or trace, of a detected signal as a function of time is also a plot as a function of distance below the surface. Therefore, the two windows represent two different subterranean levels. The standard window is chosen in a part of the record containing reflections from continuous and consistent geologic formations, and the test window is placed at the depth to be explored.

For each trace, representing a different lateral position depending on the location of the corresponding detection system on the surface, the ratio of the summation of absolute amplitudes in the test window to the summation of absolute amplitudes in the standard window for that trace is calculated. The trace-to-trace variation in weathered-layer wave attenuation is thus nullified by dividing each test window sum by a standard window sum which is determined largely by the amount of absorption experienced by the waves in that particular test window. A comparision of the resulting ratios, from trace to trace, reveals lateral details of the subterranean geology at the test window depth without the distortion caused by the weathered layer.

In the particular embodiment disclosed, a complete mapping of the subterranean geology is obtained by making repeated ratio calculations for each trace as the test window traverses, or scans, the complete length of the trace in increments. The ratio calculations for each trace are plotted as a function of time, and the plots for all the traces are aligned side-by-side according to the relative lateral positions of the corresponding detectors.

The method of the present invention is useful in a variety of applications requiring knowledge of subterranean conditions, and is readily applicable to any seismic amplitude data.

Other features, objects and advantages of the invention will become more readily apparent from the accompanying drawings, specification and claims.

DESCRIPTION OF THE ILLUSTRATED EMBODIMENT

Figure 1:
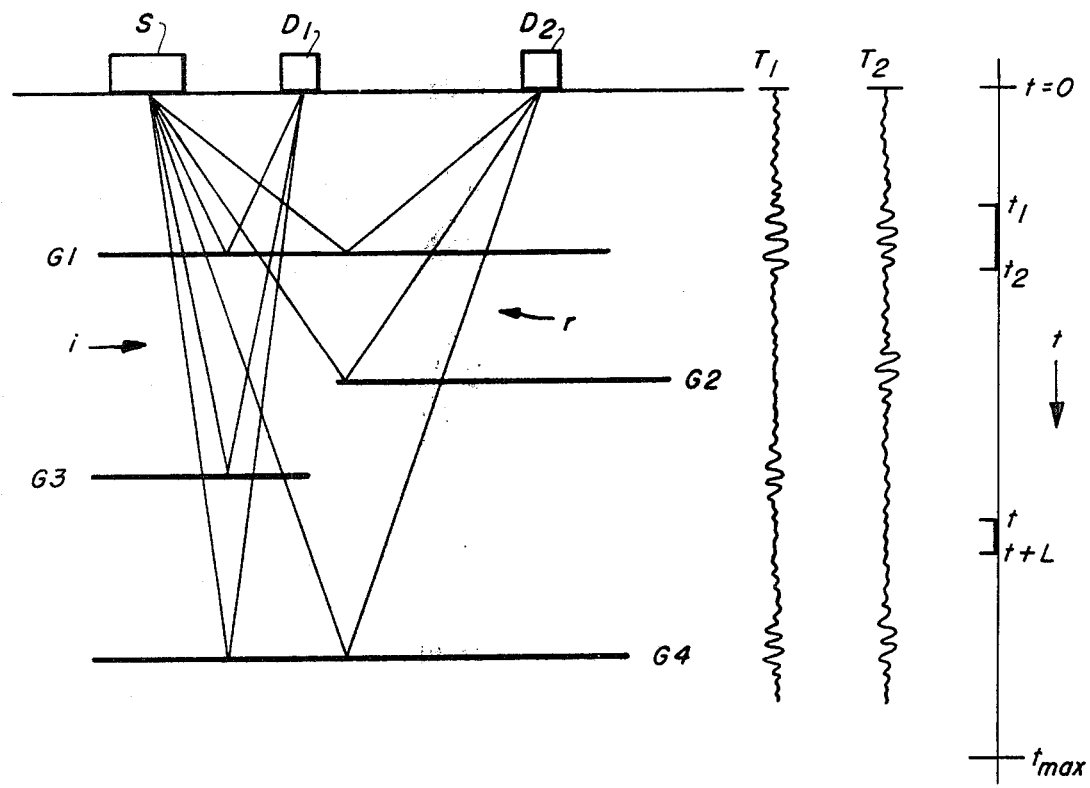
FIG. 1 is a schematic illustration of a seismic data gathering operation, with a pair of data traces represented as functions of time and depth.

In the subterranean cross-section shown in FIG. 1, incident waves i, generated at the surface by a seismic wave source S, are reflected by four reflecting interfaces, $G_1$, $G_2$, $G_3$ and $G_4$. The reflected waves r travel toward the surface, where two seismic wave detectors, $D_1$ and $D_2$, sense the reflected waves. A ray representation is used to indicate the general direction of propogation of each wave of interest. Reflectors $G_1$ and $G_4$ each extend laterally to underlie both detectors $D_1$ and $D_2$, and therefore both of these interfaces reflect waves to both detectors. Interface $G_2$ extends to the left in FIG. 1 so far as to reflect a wave to detector $D_2$, but not far enough to reflect a wave to detector $D_1$; similarly, interface $G_3$ reflects a wave to detector $D_1$, but not to detector $D_2$.

Waves reflected from deeper reflectors have greater total distances to travel from the reflecting interfaces to the detector than do waves reflected from high interfaces. Therefore, the first wave to be detected by both detectors $D_1$ and $D_2$ is the one reflected from interface $G_1$, and the last to be detected is the wave reflected from interface $G_4$. Intermediate these two waves being received by the detectors, $D_2$ receives the wave reflected from interface $G_2$, then $D_1$ receives the wave reflected from interface $G_3$.

Traces $T_1$ and $T_2$ represent seismic activity as detected and recorded by the detectors $D_1$ and $D_2$ respectively. The displacement of the curve in each trace, $T_1$ and $T_2$, measured at any point, is herein referred to as the wave amplitude. To the right of the traces $T_1$ and $T_2$ in FIG. 1 is a time scale, with time $t=0$ corresponding to the ground surface level, and time progressing downwardly to a value $t_{max}$. Points on the traces $T_1$ and $T_2$ toward $t_{max}$ on the time scale represent signals received at later times than at points toward $t=0$, and, therefore, represent readings of waves reflected from deeper geological interfaces. Consequently, the traces $T_1$ and $T_2$, as construed alongside the subterranean cross-section and the time scale, represent both depth- and time-dependent plots of wave amplitudes as reflected and as detected. Thus, as an example, the point on trace $T_1$ at time $t_1$ in FIG. 1 represents a seismic disturbance reading made at time $t_1$ of a wave pulse reflected to the detector $D_1$ from the subterranean level opposite the position $t_1$ in the subterranean cross-section. Therefore, the traces $T_1$ and $T_2$ represent reflected wave amplitude readings continuous in both time and space.

It will be appreciated that the source S may be representative of a plurality of individual sources, each emitting an acoustic pulse in sequence with the other sources in the group. Also, each detector $D_1$ and $D_2$ may be representative of an array of individual detectors, and each trace $T_1$ and $T_2$ may be a composite recording of the collection of continuous readings made by the individual detectors in the respective array. The resulting redundancy of measurements compensates for the relative weakness of reflection signals as well as lateral surface waves often encountered in seismic operations. Furthermore, while only two traces, $T_1$ and $T_2$, are shown, corresponding to two detectors $D_1$ and $D_2$, it will be appreciated that, in practice, many such traces, and detectors, are used to obtain data over a significant lateral distance. These details in the seismic source and detector arrangements are well known in the art.

Where necessary, the detector amplifiers may be preset to increase their gain during the time period in which reflected waves are being detected following the generation of a seismic pulse by the source S. As noted hereinbefore, the later a waver reflection is detected the greater the distance it has traveled from the reflecting interface to the detector. Therefore, such a wave has passed through a greater amount of energy-absorbing subterranean material than has a wave reflected from an interface nearer the surface. The result is that the later a reflected wave is detected after the pulse is generated by the source S the smaller will be its amplitude, due not to the reflecting strata condition being investigated but to the greater path length the wave has traveled through energy-absorbing material. This amplitude attenuation is thus compensated for by increasing the gain of all the detector amplifiers at a preset rate, typically about 10 db per sec. This practice of program gain is also well known in the art.

Two other procedures that are routine in processing seismic reflection data are the correction of the data for the spherical divergence of the seismic waves, and the correction for the spread of the detector array, known as move-out. The source S acts as a point source generating pulses which are basically spherical. The reflected waves, which are also basically spherical, travel different distances to the different detectors at the surface. Thus, in the absence of dip a wave reflected by a particular reflecting interface will travel a longer time to arrive at a detector that is farther from the source as measured along the surface than the time required for the same reflected wave to arrive at a detector that is closer to the source. The resulting variation in time of detection for waves reflected from the same interface causes the representation of the interface in the data traces to be distorted. A flat, horizontal reflecting interface appears curved and oriented with the concave side of the curve downward. The corrections to be made to the data compensate for the fact that the waves are spherical, and the fact that the detectors are placed at varying distances from the source. The result of the corrections, well known in the art, is to remove the curve distortions, yielding flat images of flat geological formations.

In FIG. 1, with program gain, spherical divergence and move out corrections having been made before the traces $T_1$ and $T_2$ were constructed, the time period $t_1$ to $t_2$ has been selected as a standard window, and the time period $t$ to $t+L$ has been selected as a test window. The interface $G_1$, which is within the standard window, is a continuous and consistent geologic interface. The absolute amplitude of the trace $T_1$ within the standard window $t_1$ to $t_2$ is evaluated point by point, and the sum of these amplitude values is then calculated. The sum of the absolute amplitudes of the points of the trace $T_1$ within the test window $t$ to $t+L$ is similarly determined. The ratio of the test window sum to the standard window sum is then determined. The same processing steps are performed for all traces (here, $T_2$) for the same standard and test windows. Then, the respective ratios, for all the traces, of test window sum of absolute amplitudes to standard window sum of absolute amplitudes may be compared, in order corresponding to the relative positions of the corresponding detectors, to ascertain details in the geological properties at the depth corresponding to the position of the test window on the time scale.

It may be necessary in a given case to make the standard window longer or shorter, and to adjust its position along the time scale, in order to include a continuous and consistent reflection. In practice, the minimum length of the standard window used is one wave length of the reflected waves; there is no critical upper limit on the standard window length. The optimum length L of the test window is one wave length. If the test window length is made longer, resolution will be lost; if it is made shorter, the resulting ratio will be weighted by the individual amplitidue values rather than the reflected pulse as a whole. The position of the test window is determined by the depth at which the geological features are to be observed.

The method may be applied to study more than one depth by choosing all the appropriate test window positions, carrying out the amplitude summations for each test window position, and calculating the ratio to the standard window sum for each test window sum. The test window positions may be chosen based on a scrutiny of the traces, $T_1$ and $T_2$, before the method of the invention is applied, or based on information from independent sources.

To obtain a complete mapping of a subterranean cross-section, the test window is made to scan each trace, and amplitude ratios are obtained for each position of the scanning window. Details of this embodiment may be appreciated by reference to FIG. 2, which illustrates a flow diagram for an exemplary digital computer program capable of performing the method of the invention. Any general purpose digital computer system, such as the Control Data Corporation CDC 3500 Data Processing System, and any suitable conventional computer language such as FORTRAN may be employed. The method may also be applied using special purpose computers, analog computers or manual calculations.

For use with digital processing equipment and techniques, the traces are converted from continuous curve form to digital form. In the conversion, the amplitude values of the continuous curve waveform are measured at equal time intervals having a spacing which is established by a sampling rate calculated to reproduce a true digital representation of the waveform signal. Then, digital numbers representing the signal amplitude at selected intervals are associated with digital numbers representing each corresponding data point interval along the time axis. Typical time intervals between data point measurements are one to four milliseconds.

Figure 2:
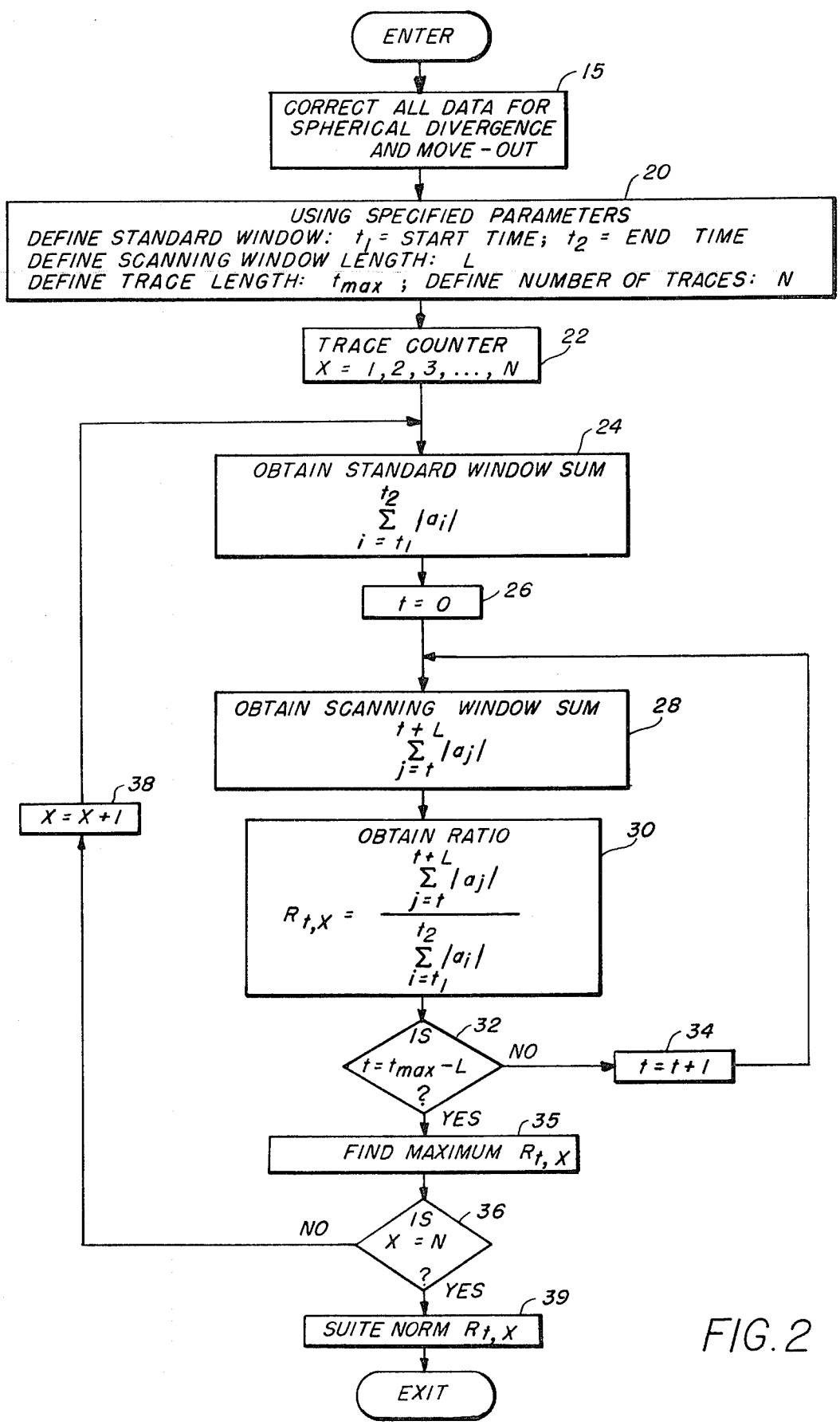
FIG. 2 is a flow diagram of the scanning window embodiment of the method of the invention.

In FIG. 2, the spherical divergence and moveout corrections discussed hereinbefore may be applied to the data as indicated at block 15. Then, the initial steps of the method of the invention are defined in block 20. The position and size of the standard window are selected, as described hereinbefore, and identified by the parameters $t_1$ and $t_2$ as specific time values on the time scale shown in FIG. 1. The length of the scanning test window is determined as noted hereinbefore, and identified as L. The length of all the traces is identified in terms of data recording time from 0 to $t_{max}$ where 0 represents the time of detection of signals "reflected" from some point at or near the surface, and $t_{max}$ represents the time of detection of signals reflected at the greatest depth to be considered. The next step, indicated in block 22, is to set the number N of traces X to be processed. The symbol X, which identifies any one trace, may take on the integer values of 1 to N, and is initially equal to 1, indicating the first trace. This completes the identification of all the constant parameters in the method: $t_1$, $t_2$, L, N, and $t_{max}$.

The first calculation to be made is indicated in block 24. The absolute amplitude of the signal represented at each measured data point on trace X (at this point, X=1) between $t_1$ and $t_2$ is evaluated as $a_i$. The value $|a_i|$ is the absolute value of the amplitude of such signal at the time t=i, and the index i takes on all time values at which digital data values are measured from $t_1$ to $t_2$, the limits of the standard window. All the absolute values $|a_i|$ are then summed over the standard window length, $t_1$ to $t_2$.

The range on each trace which the scanning window is to traverse must be defined. In block 26, one end of this range is determined by setting the parameter t equal to a selected time value, here, 0 corresponding to the surface as shown in FIG. 1. This time value, which could be any value along the trace between 0 and $t_{max}$, serves as the starting point from which the scanning window will traverse each trace. The end point of the traverse will be determined hereinbelow.

With the scanning window set at the first position in the traverse of trace X, as determined in block 26, the absolute values of the amplitude of the signal at all measured data points in the scanning window are evaluated and summed according to block 28. The amplitude values are $a_j$, where the index j takes on all time values for which digital data values are measured over the scanning window. Since the length of the scanning window, L, was determined at block 20, the index i values must range from t, as set here in block 26, to $t+L$. No matter where on the trace the scanning window is positioned by setting t equal to some value, the length of the scanning window and, therefore, the size of the range of the index j, are always defined as L.

The ratio of the sum of the absolute values of the signal amplitudes throughout the scanning window, as obtained in block 28, to the sum of the absolute values of the signal amplitudes throughout the standard window, as obtained in block 24, is calculated at block 30. This ratio, $R_{t,X}$, is identified by the subscripts X, the value of which identifies where the scanning window is positioned on the trace.

The operation carried out in blocks 28 and 30 are to be performed for all positions of the scanning window on the trace X. Diamond 32 indicates a test to determine whether the current position of the scanning window is at the end of the trace X by testing the value of t against $t_{max}-L$. When the scanning window has reached the last position to be processed on the trace, t will have the value $t_{max}-L$, which places the highest time value of the test window, $t+L$, at $t_{max}$. If t is not equal to $t_{max}-L$, as indicated by the "NO," the next step to be performed is given in block 34. This step 34 is the advancement of the scanning window by increasing the value of the scanning window starting time t, to $t+1$. Since t was initially set equal to zero in block 26, the scanning window is now placed one time unit down the trace X from the surface position. The increment by which t is increased in block 34 could be any value; 1 is chosen here as an illustration, and causes the scanning window to move forward by the interval between adjacent measured digital data points.

With the scanning window moved to its second position, the amplitude evaluation and summation indicated in block 28 is performed again. Note that as long as the incremental shift imposed on the scanning window in block 34 is less than the scanning window length, L, there will be amplitude points, $a_j$ in the current block 28 summation that were included in the first block 28 summation hereinbefore.

The ratio, $R_{t,X}$, with t equal to 1, is evaluated in block 30, and the test in diamond 32 is again imposed. The loop including steps 28, 30, 32, and 34 is reiterated for each new position of the scanning window until t is equal to $t_{max}-L$. Then, after the operations in blocks 28 and 30 are completed, the answer to the test question in block 32 is "YES." At that point, all ratios for the first trace, X=1, have been obtained: $R_{0,1}$, $R_{1,1}$, . . . $R_{t_{max}-L,1}$. At block 35, these ratio values are tested to find the largest one among them. This maximum $R_{t,X}$ value is noted, and will be employed for adjustment of the process output as described hereinafter.

All N of the traces must be processed through steps 24 to 35 as trace X=1 has just been. Therefore, at diamond 36, the value of X is tested against N, the number of traces to be processed. If X is not equal to N, the "NO" path leads to block 38, where the value of X is increased by 1. This shifts the process from the current trace (here, the first one with X=1) to the next trace (X=2).

For the new trace, the standard window sum of absolute amplitude values is obtained at block 34. This sum may be different from the previous standard window sum, and from all other standard window sums for the other traces, due to the lateral variations in the weathered-layer wave attenuation properties.

The scanning window for the current trace is made to traverse the trace, starting at t=0 in block 26, advancing, at block 34, to $t_{max}-L$, as tested in diamond 32. For each position in the traverse, the absolute amplitude sum for the scan window is obtained in block 28, and the corresponding scan window sum to standard window sum ratio is obtained in block 30. When $t=t_{max}-L$ for X=2, all the ratios $R_{0,2}, R_{1,2}, \ldots R_{tmax-L,2}$ have been evaluated. These ratios are tested in block 35, and the maximum ratio for X=2 is noted. Again, the trace symbol X is compared to N. If X is not equal to N, the next trace is processed through the steps 24 to 35 as hereinbefore. Finally, when X=N at diamond 35, all the data has been processed in the method of the invention, and the program proceeds to block 39.

In block 39, the process of normalization is applied to all the ratios $R_{t,X}$. This is a routine process used to shrink or expand all the output values from a program, to obtain an optimum presentation of the process results on whatever medium is used to display the output. A plotter and a recorder are two examples of such media. An optimum presentation on a particular output display device is achieved when no output values exceed the range of the device, and when the entire range is used to display the output. Therefore, the maximum output value must be adjusted to make it equal to the highest value which may be displayed by the medium. At block 39, the maximum output value is found by comparing the maximum ratio values from each trace, as obtained at block 35. The largest of these maximum ratio values is the maximum output value for all the output ratios. This maximum ratio is compared to the range of the output display device to be used, and the factor by which the maximum ratio must be multiplied to make the ratio equal to the device range is noted. Then, before the output ratios are presented to the output display device, they are all multiplied by that same factor. Thus, if the factor is greater than one, the entire output is increased in value; if the factor is less than one; the output is diminished. Whatever the value of the multiplicative factor, the relative values of the output ratios are not changed. It will be appreciated that, in a particular case, rather than normalizing the output based on the maximum output ratio, the normalization to the output display device could be based on some other value, such as the average of the maximum ratio values of all the traces.

Once the ratios from the program in FIG. 2 are presented, on a suitable display device, as separate traces, one for each of the original data traces, side-by-side in the same lateral relation as the original data traces, the resulting curves may be interpreted as plots against time and depth. Then, just as the original data traces could be analyzed for information about reflecting subterranean strata, as in FIG. 1, the ratio traces may also be analyzed in terms of reflection effects. Large amplitudes in ratio traces indicate large reflections. However, the amplitude variations in the ratio traces will not be distorted by the lateral variations in the weathered layer.

The scanning window embodiment of the method of the present invention to enhance reflection amplitude data has been employed with success in such operations as identifying the boundaries of a salt and shale diapir, which is a poor reflector, and locating reefs, which are good reflectors. Other possible applications of the method include the mapping of oil and gas accumulations in stratigraphic traps, the monitoring of gas injection into an underground gas storage reservoir, and the monitoring of the injection of gas or light liquid in secondary recovery operations.

The foregoing disclosure and description of the invention is illustrative and explanatory thereof, and various changes in the method steps as well as in the details of the illustrated methods may be made within the scope of the appended claims without departing from the spirit of the invention.

The embodiments of the invention in which an exclusive property or privilege is claimed are defined as follows:

1. A method for detecting reflection waves in a plurality of seismic data traces comprising a seismic time record section obtained from a linear array of acoustic wave detectors and for enhancing said record section by attenuating trace to trace variations in amplitude due to weathered layers near the earth's surface, comprising the steps of:

obtaining a digital seismic record section from a linear array of seismic detectors and shot points by activating an acoustic energy source at least once along a given exploration line on the earth's surface and receiving reflected acoustic energy at a plurality of seismic detectors displaced longitudinally from said shot point along said line and digitally recording the received acoustic energy at each of said detectors as a function of time to provide a plurality of digitally recorded seismic traces;

correcting said record section for amplitude attenuation caused by the spherical divergence of acoustic energy from said at least one shot point;

correcting said record section for the different times of arrival of reflected acoustic energy at each of said plurality of detectors due to the different longitudinal displacements of said detectors from said at least one shot point;

correcting said record section for trace to trace amplitude variations due to weathered layers near the earth's surface by selecting a standard time window in a region of said record containing reflections from continuous and consistent geological boundaries common to all traces comprising said record;

selecting a timewise starting point common to all traces;

selecting a timewise end point common to all traces;

selecting a fixed duration scanning time window common to all traces;

selecting a fixed scanning increment common to all traces;

summing, point by point, the absolute value of the digital trace amplitudes in said standard time window;

placing said scanning window at said starting point;

advancing said scanning window from said starting point to said end point along a trace in steps equal to said scanning increment and summing point by point the absolute values of the amplitude of said digital traces within the scanning window and dividing each said scanning window sum by said standard window sum to form a ratio output signal for each said scanning window as it advances along each trace;

aligning said ratio output signals in time along each of said traces; and recording as a function of time the digital ratio output signals corresponding to the seismic record section.

2. The method of claim 1 wherein said length of said scanning window is smaller than said scanning increment.

3. The method of claim 2 wherein said starting point is selected at the beginning of all the seismic data traces and said end point is selected at the end of all seismic data traces.

4. The method of claim 1 wherein said starting point is selected at the beginning of all the seismic data traces and said end point is selected at the end of all the seismic data traces.

* * * * *